US011621502B2

(12) United States Patent
Franco

(10) Patent No.: US 11,621,502 B2
(45) Date of Patent: Apr. 4, 2023

(54) HYBRID CABLE CRIMP

(71) Applicant: Juan Franco, Blacksburg, VA (US)

(72) Inventor: Juan Franco, Blacksburg, VA (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/017,340

(22) Filed: Sep. 10, 2020

(65) Prior Publication Data

US 2022/0077604 A1 Mar. 10, 2022

(51) Int. Cl.

| | |
|---|---|
| ***H01B 7/00*** | (2006.01) |
| ***H02G 15/00*** | (2006.01) |
| ***H01R 4/20*** | (2006.01) |
| ***H01R 4/18*** | (2006.01) |
| ***E21B 47/12*** | (2012.01) |
| ***H01R 43/048*** | (2006.01) |
| *H01B 11/00* | (2006.01) |
| *H01R 101/00* | (2006.01) |

(52) U.S. Cl.

CPC ............... *H01R 4/20* (2013.01); *E21B 47/12* (2013.01); *H01R 4/183* (2013.01); *H01R 43/048* (2013.01); *H01B 11/00* (2013.01); *H01R 2101/00* (2013.01)

(58) Field of Classification Search

CPC .............................. H01B 7/0072; H02G 15/00

See application file for complete search history.

(56) References Cited

U.S. PATENT DOCUMENTS 4,229,613 A * 10/1980 Braun .................. B29D 23/001 138/103
4,462,649 A * 7/1984 Medford ................. F16L 33/32 174/47
5,210,812 A 5/1993 Nilsson et al.
5,666,453 A 9/1997 Dannenmann
5,921,285 A * 7/1999 Quigley ................... D04C 1/06 138/125
7,119,274 B2 * 10/2006 Bello .................. H01B 7/0072 174/36
7,277,614 B2 * 10/2007 Cody .................. G02B 6/4472 385/100
7,397,002 B2 * 7/2008 Lagro .................... H02G 1/086 138/104

(Continued)

OTHER PUBLICATIONS

International Search Report and Written Opinion for International Application No. PCT/US2021/071372; International Filing Date Sep. 3, 2021; dated Dec. 20, 2021; 10 Pages.

*Primary Examiner* — Chau N Nguyen

(74) *Attorney, Agent, or Firm* — Cantor Colburn LLP

(57) ABSTRACT

A communication system is included in a work string. The communication system includes a communication cable and a crimp sleeve. The communication cable has a housing with a communication line and a metal tube therein, a free line end of the communication line and a free tube end of the metal tube extending from an open end of the housing. The crimp sleeve includes a first sleeve section having a first inner diameter configured to receive the open end of the housing, a second sleeve section having a second inner diameter configured to receive the free tube end of the metal tube, and an opening configured to allow the free line end of the communication line to pass out of the crimp sleeve.

5 Claims, 6 Drawing Sheets

(56) References Cited

U.S. PATENT DOCUMENTS

| | | | | |
|---|---|---|---|---|
| 8,695,214 | B2 * | 4/2014 | Thomas ............... | G02B 6/4463<br>385/100 |
| 11,143,530 | B2 * | 10/2021 | Melin ................... | B21C 37/202 |
| 2005/0259928 | A1 | 11/2005 | Elkins, II et al. | |
| 2009/0142950 | A1 | 6/2009 | Schimmele-Brell et al. | |
| 2019/0242200 | A1 | 8/2019 | Bujold et al. | |

* cited by examiner

HYBRID CABLE CRIMP

BACKGROUND

In the resource recovery industry, a work string is deployed in a wellbore to perform various functions. The work string includes various downhole devices that are in communication with surface equipment. One method of communication includes conveying communication lines, such as optical fiber, conductive wire, etc. downhole on the work string to extend between the surface equipment and the downhole devices. These communication lines are flexible and can be moved around on the work string if not supported. There is a need to secure an end of the communication line at or near the downhole device.

SUMMARY

An embodiment of a communication system for a work string, including a communication cable having a housing with a communication line and a metal tube therein, a free line end of the communication line and a free tube end of the metal tube extending from an open end of the housing, and a crimp sleeve including a first sleeve section having a first inner diameter configured to receive the open end of the housing, a second sleeve section having a second inner diameter configured to receive the free tube end of the metal tube, and an opening configured to allow the free line end of the communication line to pass out of the crimp sleeve.

A method of forming a communication system for a work string, comprising inserting an open end of a communication cable of the work string into a first sleeve section of a crimp sleeve, the communication cable including a housing surrounding a communication line and a metal tube, wherein a free tube end of the metal tube and a free line end of the communication line extend from the open end, the crimp sleeve including the first sleeve section having a first inner diameter and a second sleeve section having a second inner diameter, sliding the free tube end of the metal tube through the second sleeve section of the crimp sleeve, and sliding the free line end of the communication line through an opening in the crimp sleeve.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
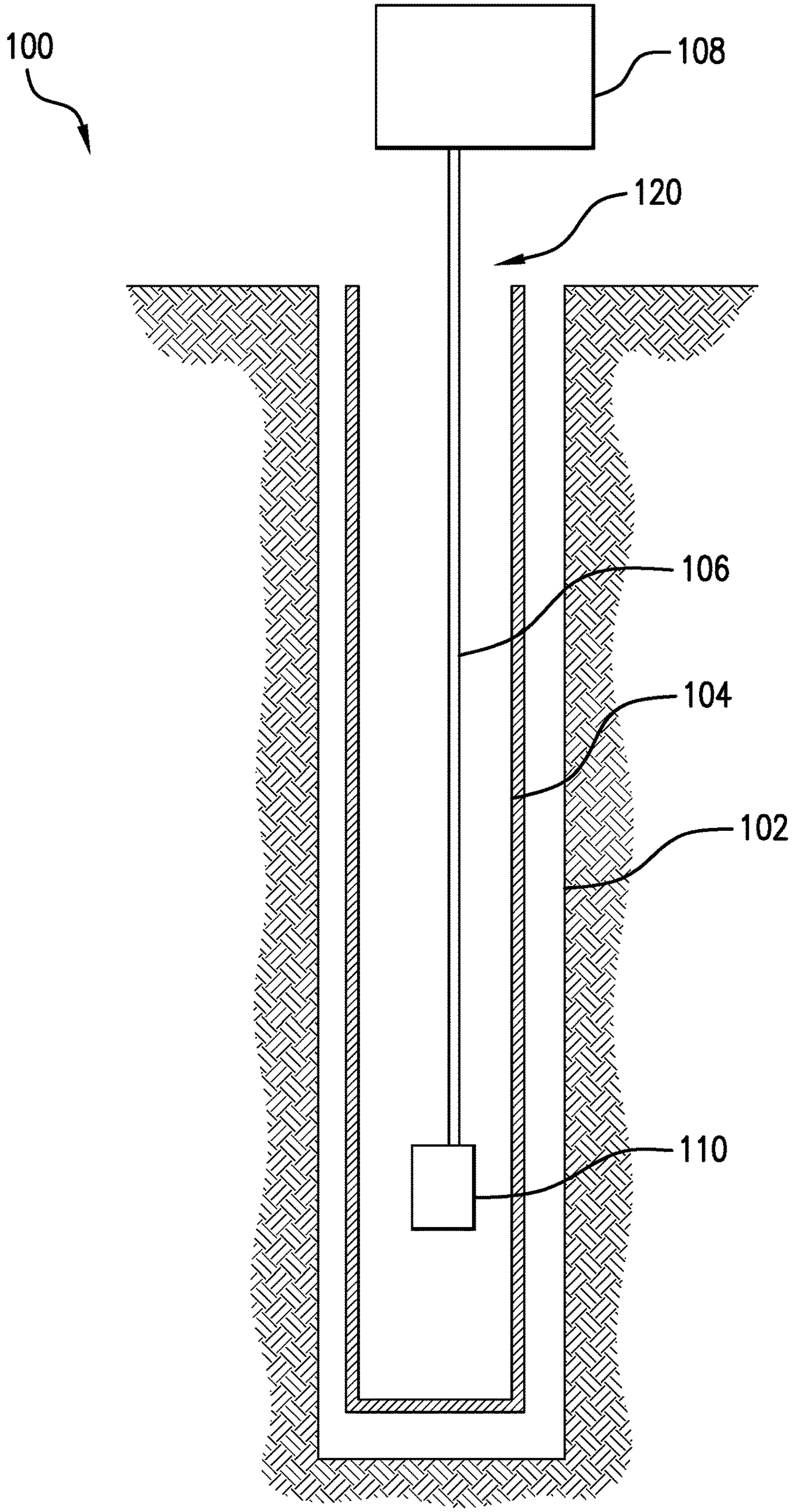
FIG. 1 shows a system for performing an operation in a wellbore in an illustrative embodiment.

Referring to FIG. 1, a system 100 for performing an operation in a wellbore 102 is shown in an illustrative embodiment. The system 100 includes a work string 104 having a communication system 120 thereon. The communication system 120 includes a communication cable 106 extending along a length of the work string 104, a surface unit 108 and a downhole device 110. The communication cable 106 can include an electrical wire, an optical fiber or both. The communication cable 106 extends between the surface unit 108 and the downhole device 110. The surface unit 108 can include a processor, an optical interrogator, a transmission circuit, a receiver circuit, etc., in various embodiments. The downhole device 110 can include a pressure/temperature gauge, an optical detector, etc., in various embodiments.

Figure 2:
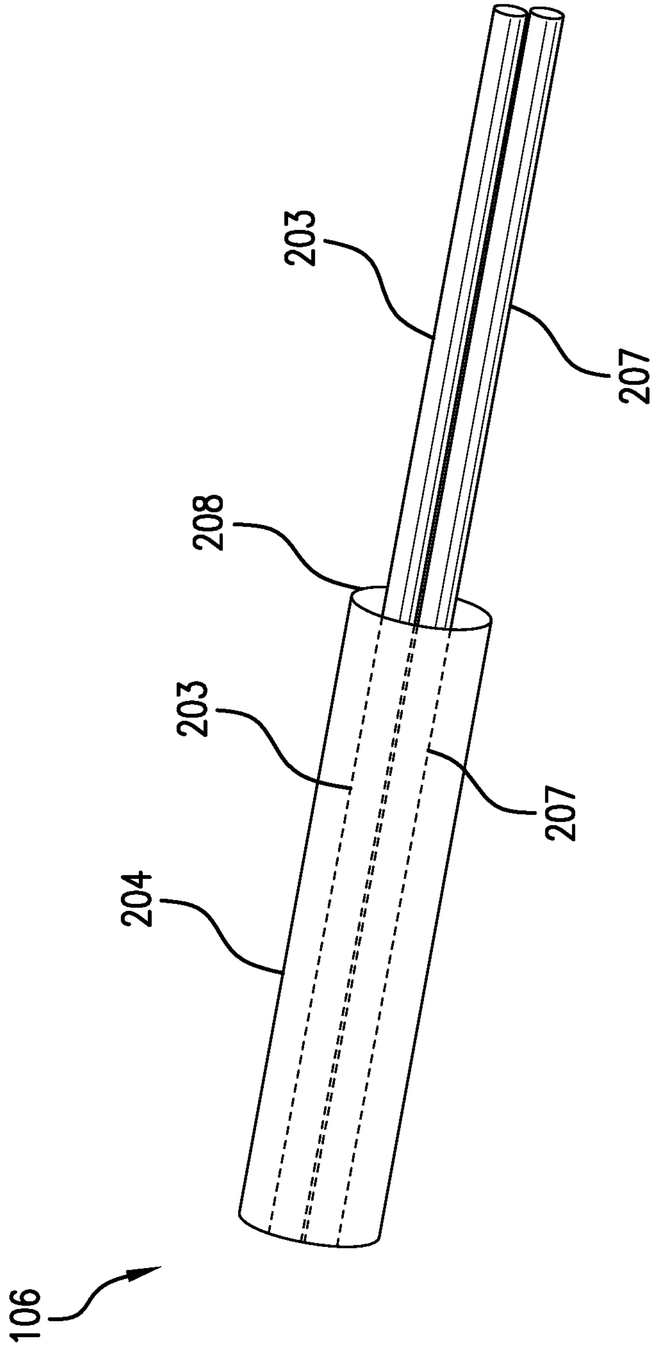
FIG. 2 shows a detailed view of the communication cable.

FIG. 2 shows a detailed view of the communication cable 106 of FIG. 1. The communication cable 106 includes a communication line 202 running through a sheath, cover or housing 204 that forms a protective layer for the communication line 202. The communication line 202 can be an optical fiber, an electrical wire, for a combination of optical fiber and electrical wire. A rigid metal rod or metal tube 206 serves as a structural support to maintain the communication line 202 in place with respect to the work string 104. The free line end 203 of the communication line 202 and a free tube end 207 of the metal tube 206 are shown emerging from an open end 208 of the housing 204.

Figure 3:
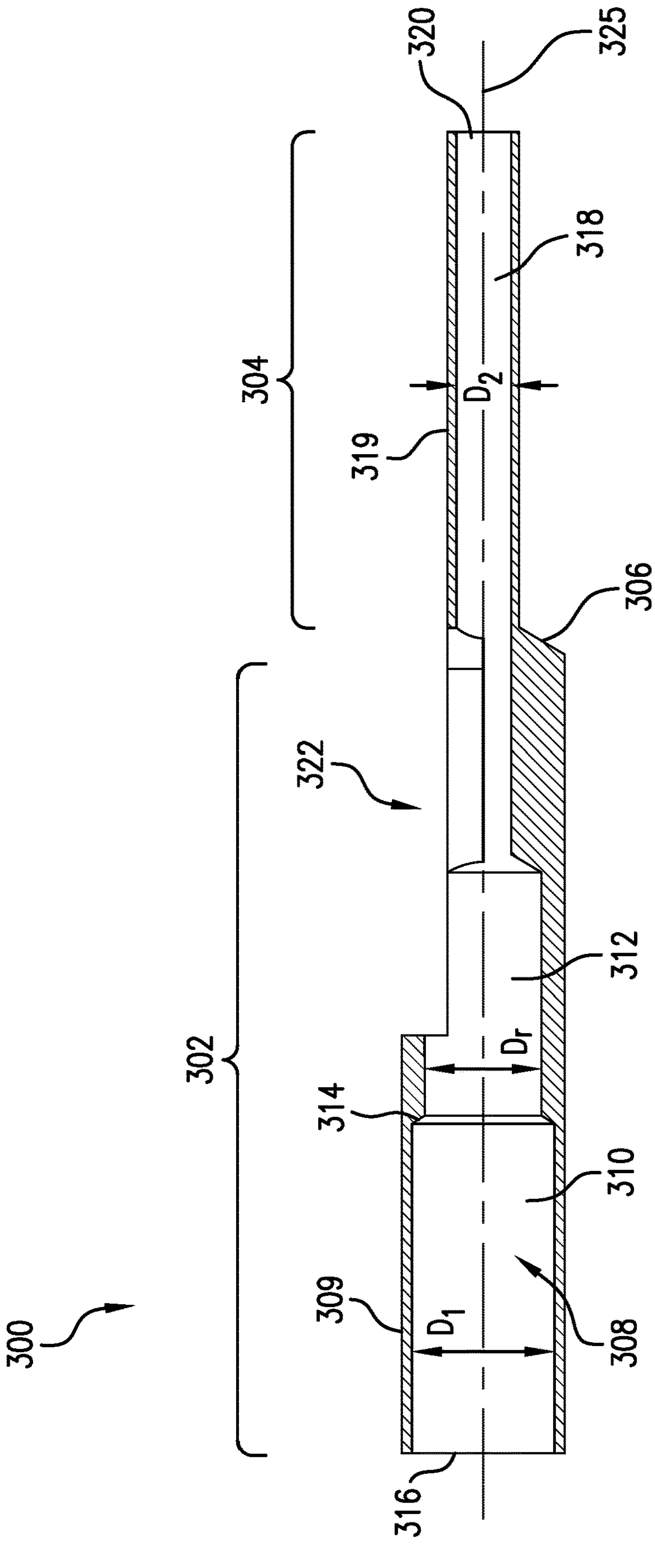
FIG. 3 shows a cross-sectional view of a crimp sleeve in an illustrative embodiment.
Figure 4:
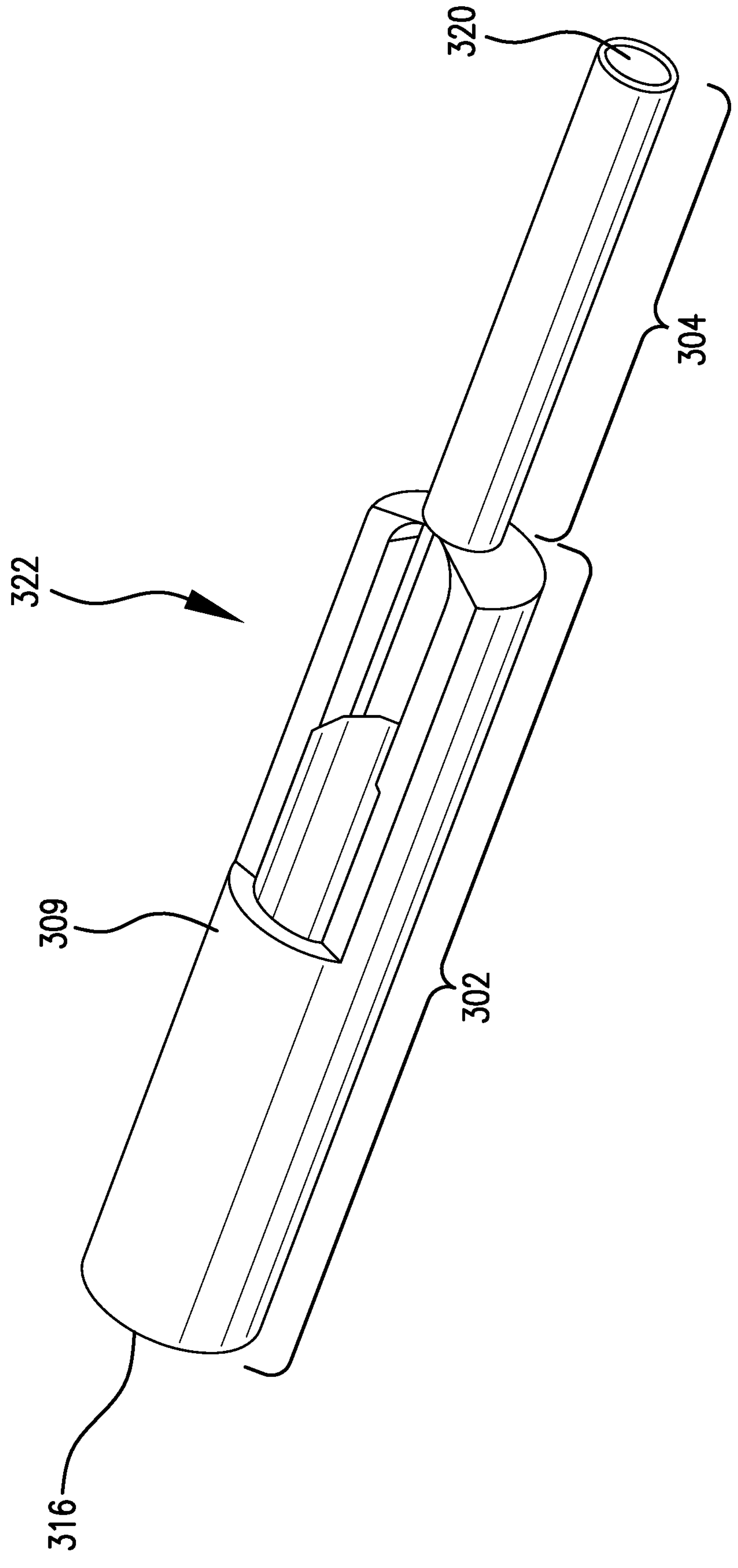
FIG. 4 shows a perspective view of the crimp sleeve of FIG. 3.

FIG. 3 shows a cross-sectional view of a crimp sleeve 300 in an illustrative embodiment. FIG. 4 shows a perspective view 400 of the crimp sleeve 300 of FIG. 3. The crimp sleeve 300 slides over the open end 208 of the housing 204 and allows the communication line 202 emerging from the open end 208 to extend to the downhole device 110. The crimp sleeve 300 extends along a longitudinal axis 330.

The crimp sleeve 300 includes a first sleeve section 302 at a first end of the crimp sleeve 300 and a second sleeve section 304 at a second end of the crimp sleeve 300 opposite the first end. The first sleeve section 302 is connected to the second sleeve section 304 by a transition region 306.

The first sleeve section 302 forms a generally cylindrical shell with a first bore 308 within a sidewall 309 of the first sleeve section 302. The first bore 308 has a first bore section 310 and a second bore section 312 separated from the first bore section 310 by a shoulder 314. The first bore section 310 has a first inner diameter $D_1$ and the second bore section 312 has a reduced inner diameter $D_r$ that is less than the first inner diameter. The first sleeve section 302 includes a first aperture 316 for receiving the communication cable 106. In generally, the first inner diameter D1 can be sized to match or to be slightly greater than an outer diameter of the housing 204. Therefore, the first sleeve section 302 is able receive the housing 204 with a snug fit.

The second sleeve section 304 forms a generally cylindrical shell including a second bore 318 having a second inner diameter $D_2$. The second inner diameter $D_2$ is less than the first inner diameter $D_1$ as well as less than the reduced inner diameter $D_r$, also referred to herein as the third inner diameter. The second inner diameter $D_2$ can be sized to match or to be slightly greater than an outer diameter of the metal tube 206. The second sleeve section 304 includes a second aperture 320 that allows passage of the metal rod out of the crimp sleeve 300. The crimp sleeve 300 also includes an opening 322 in a sidewall 309 of the first sleeve section 302. Therefore, the second sleeve section 304 is able to receive the free tube end 207 and allow the free tube end to pass through with a snug fit. In various embodiments, the opening 322 extends from the transition region 306 to expose a location in at least a portion of the second bore section 312. The opening 322 allows the free line end 203 of the communication line 202 that emerges from the open end 208 of the housing 204 to pass out of the crimp sleeve 300.

Figure 5:
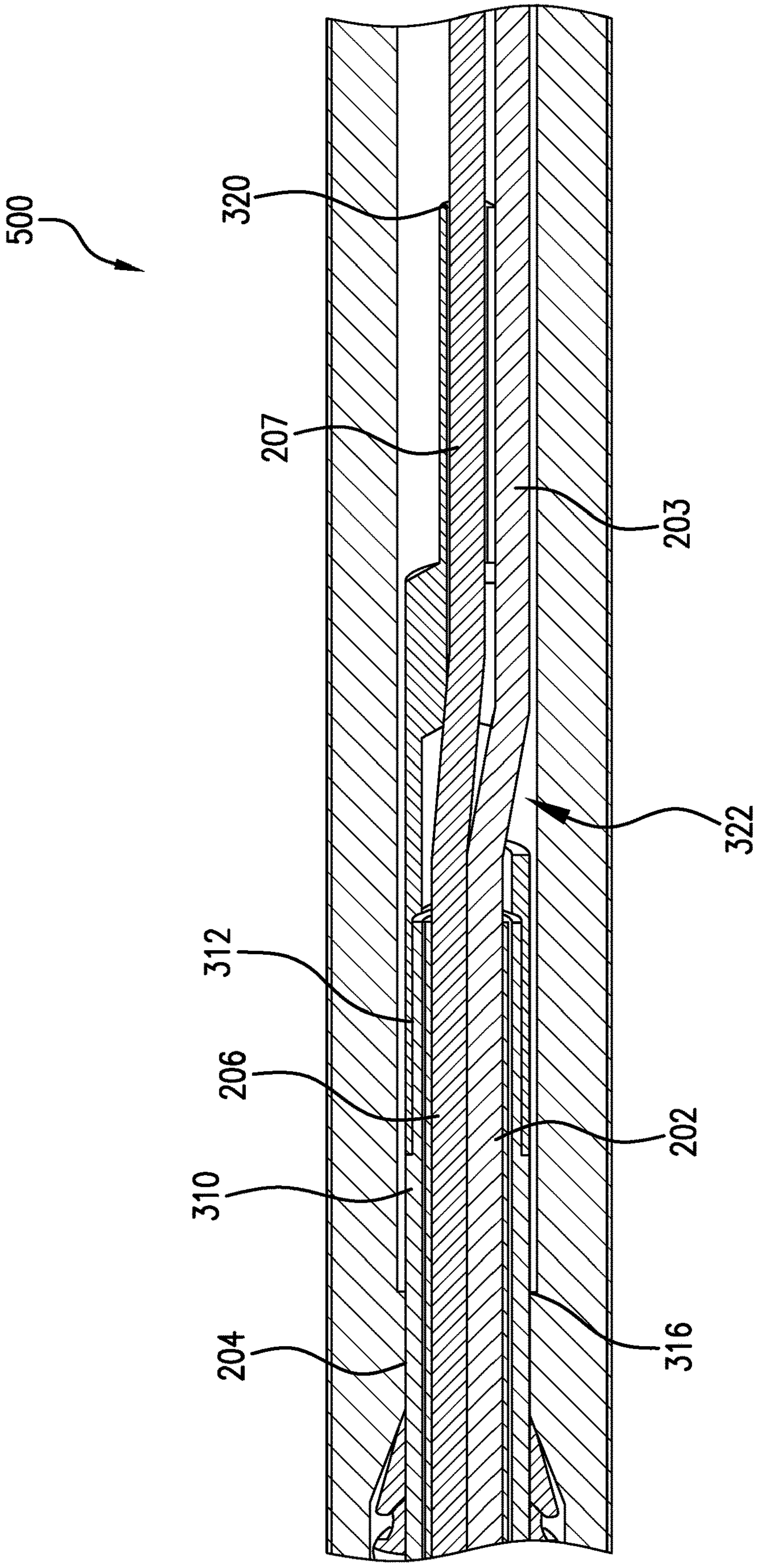
FIG. 5 shows a cross-sectional view of an assembly of the crimp sleeve and the communication cable.
Figure 6:
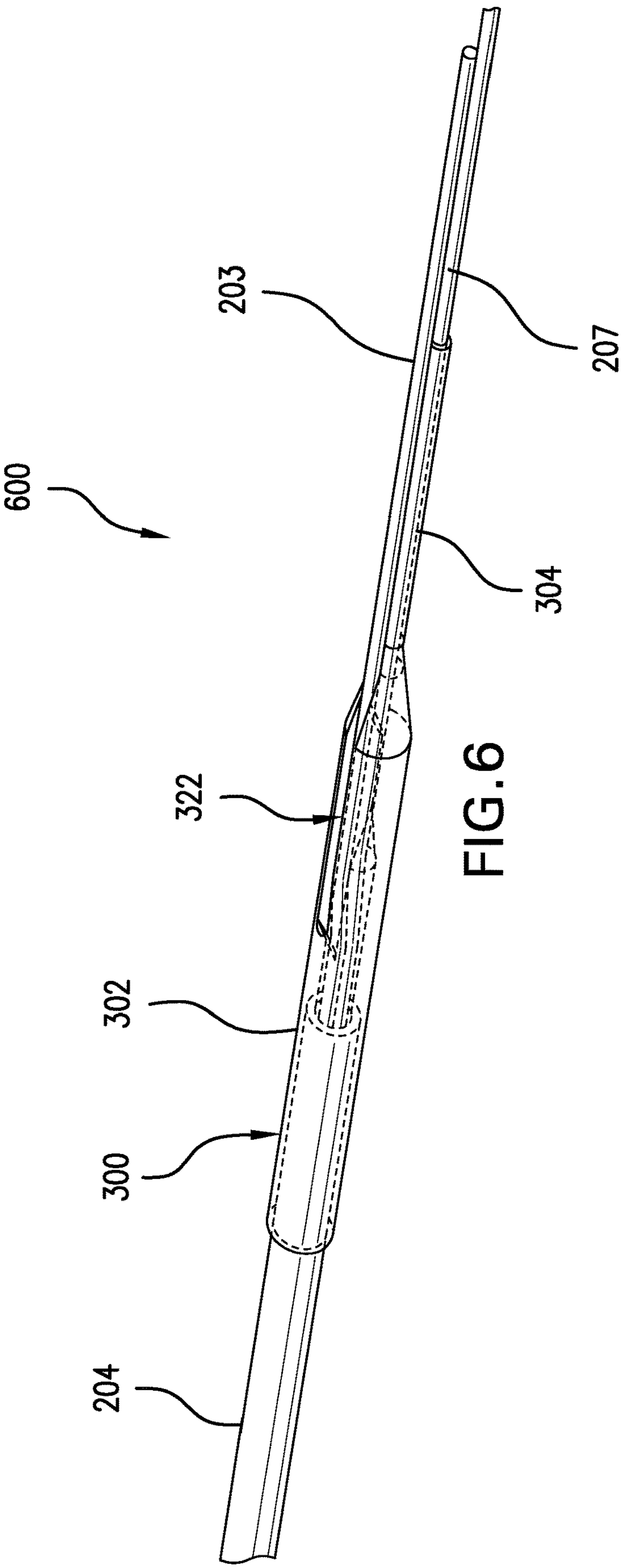
FIG. 6 shows a perspective view of the assembly of FIG. 5.

FIG. 5 shows a cross-sectional view of an assembly 500 of the crimp sleeve 300 and the communication cable 106. FIG. 6 shows a perspective view 600 of the assembly 500 of FIG. 5. In order to form the assembly 500 of FIGS. 5 and 6, the housing 204 of the communication cable 106, the communication line 202 and the metal tube 206 are inserted into the first aperture 316 of the first sleeve section 302 of the crimp sleeve 300. The free tube end 207 of the metal tube 206 is slid through the first sleeve section 302 and into the second sleeve section 304 of the crimp sleeve 300 to emerge from the second sleeve section 304 via the second aperture 320. The free line end 203 of the communication line 202 is diverted to pass through the opening 322 of the crimp sleeve 300. The housing 204 slides through the first bore section 310 and the second bore section 312 of the first sleeve section 302. The portion of the housing 204 that slides through the second bore section 312 is restricted in diameter by the inner surfaces of the second bore section 312.

The first sleeve section 302 can be crimped in order to grip the outer surface of the housing 204. Also, the second sleeve section 304 can be crimped in order to grip the metal tube 206. When the first sleeve section 302 and the second sleeve section 304 are crimped, the free line end 203 of the communication line 202 is unsecured or not mechanically affixed to the crimp sleeve 300.

Set forth below are some embodiments of the foregoing disclosure:

Embodiment 1

A communication system for a work string, including a communication cable having a housing with a communication line and a metal tube therein, a free line end of the communication line and a free tube end of the metal tube extending from an open end of the housing, and a crimp sleeve including a first sleeve section having a first inner diameter configured to receive the open end of the housing, a second sleeve section having a second inner diameter configured to receive the free tube end of the metal tube, and an opening configured to allow the free line end of the communication line to pass out of the crimp sleeve.

Embodiment 2

The communication system of any prior embodiment, wherein the opening is in a sidewall of the crimp sleeve.

Embodiment 3

The communication system of any prior embodiment, wherein the sidewall is in the first sleeve section.

Embodiment 4

The communication system of any prior embodiment, wherein the second inner diameter of the second sleeve section is less than the first inner diameter of the first sleeve section.

Embodiment 5

The communication system of any prior embodiment, wherein the first sleeve section includes a first bore section having the first inner diameter and a second bore section having a third inner diameter less than the first inner diameter.

Embodiment 6

The communication system of any prior embodiment, wherein the second bore section restricts the open end of the housing.

Embodiment 7

The communication system of any prior embodiment, wherein the free line end of the communication line is not mechanically affixed to the crimp sleeve when the first sleeve section is crimped to the housing of the communication cable and the second sleeve section is crimped to the free tube end.

Embodiment 8

A method of forming a communication system for a work string, including inserting an open end of a communication cable of the work string into a first sleeve section of a crimp sleeve, the communication cable including a housing surrounding a communication line and a metal tube, wherein a free tube end of the metal tube and a free line end of the communication line extend from the open end, the crimp sleeve including the first sleeve section having a first inner diameter and a second sleeve section having a second inner diameter, sliding the free tube end of the metal tube through the second sleeve section of the crimp sleeve, and sliding the free line end of the communication line through an opening in the crimp sleeve.

Embodiment 9

The method of any prior embodiment, wherein the opening is in a sidewall of the crimp sleeve.

Embodiment 10

The method of any prior embodiment, wherein the sidewall is in the first sleeve section.

Embodiment 11

The method of any prior embodiment, wherein the second inner diameter of the second sleeve section is less than the first inner diameter of the first sleeve section.

Embodiment 12

The method of any prior embodiment, wherein the first sleeve section includes a first bore section having the first inner diameter and a second bore section having a third inner diameter less than the first inner diameter.

Embodiment 13

The method of any prior embodiment, further comprising sliding the open end into the second bore section to restrict a diameter of the open end of the communication cable in the second bore section.

Embodiment 14

The method of any prior embodiment, further comprising crimping the first sleeve section to the housing and crimping the second sleeve section to the free tube end.

Embodiment 15

The method of any prior embodiment, wherein the free line end of the communication line is not mechanically affixed to the crimp sleeve when the first sleeve section is crimped to the housing and the second sleeve section is crimped to the free tube end.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A communication system for a work string, comprising:
- a communication cable having a housing with a communication line and a metal tube therein, a free line end of the communication line and a free tube end of the metal tube extending from an open end of the housing; and
- a crimp sleeve, including:
  - a first sleeve section having a first bore section and a second bore section, the first bore section defining a first inner diameter and a first aperture configured to receive the free line end of the communication line and the free tube end of the metal tube extending from the open end of the housing, wherein the first sleeve section is crimped to grip the housing, the second bore section having a third inner diameter less than the first inner diameter, wherein the second bore section restricts the open end of the housing;
  - a second sleeve section having a second bore section defining a second inner diameter and a second aperture configured to receive the free tube end of the metal tube, wherein the free tube end passes out of the crimp sleeve via the second aperture wherein the second sleeve section is crimped to grip the metal tube; and
  - an opening configured to allow the free line end of the communication line to pass out of the crimp sleeve.

2. The communication system of claim 1, wherein the opening is in a sidewall of the crimp sleeve.

3. The communication system of claim 2, wherein the sidewall is in the first sleeve section.

4. The communication system of claim 1, wherein the second inner diameter of the second sleeve section is less than the first inner diameter of the first sleeve section.

5. The communication system of claim 1, wherein the free line end of the communication line is not mechanically affixed to the crimp sleeve when the first sleeve section is crimped to the housing of the communication cable and the second sleeve section is crimped to the free tube end.

* * * * *